United States Patent
Yang et al.

(10) Patent No.: US 11,369,004 B2
(45) Date of Patent: Jun. 21, 2022

(54) COMMUNICATION METHOD, ACCESS NETWORK DEVICE, AND TERMINAL

(71) Applicant: HUAWEI TECHNOLOGIES CO., LTD., Guangdong (CN)

(72) Inventors: Yubo Yang, Shanghai (CN); Yi Wang, Shanghai (CN); Jinlin Peng, Shanghai (CN); Peng Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 55 days.

(21) Appl. No.: 16/786,891

(22) Filed: Feb. 10, 2020

(65) Prior Publication Data

US 2020/0178353 A1 Jun. 4, 2020

Related U.S. Application Data

(63) Continuation of application No. PCT/CN2018/099832, filed on Aug. 10, 2018.

(30) Foreign Application Priority Data

Aug. 11, 2017 (CN) .......................... 201710687952.9

(51) Int. Cl.
*H04W 88/06* (2009.01)
*H04W 24/08* (2009.01)
(Continued)

(52) U.S. Cl.
CPC ........... *H04W 88/06* (2013.01); *H04L 1/1819* (2013.01); *H04L 5/0082* (2013.01);
(Continued)

(58) Field of Classification Search
CPC ... H04L 5/0082; H04L 1/1819; H04L 1/1887; H04L 1/18; H04L 5/0092; H04L 1/1854;
(Continued)

(56) References Cited

U.S. PATENT DOCUMENTS

2014/0321342 A1 10/2014 Kalyanasundaram et al.
2016/0353453 A1 12/2016 Au et al.
(Continued)

FOREIGN PATENT DOCUMENTS

| CN | 101754395 A | 6/2010 |
| CN | 105992320 A | 10/2016 |
| CN | 106851662 A | 6/2017 |

OTHER PUBLICATIONS

Goto 16636621,Certified_Copy_of_Foreign_Priority_Application2017-155578 2017JP-2017-155578 Aug. 10, 2017.*
(Continued)

*Primary Examiner* — Kevin C. Harper
*Assistant Examiner* — Henry Baron
(74) *Attorney, Agent, or Firm* — Womble Bond Dickinson (US) LLP

(57) ABSTRACT

This application provides a communication method, an access network device, and a terminal. The communication method includes: monitoring, by a terminal after completing initial transmission of first uplink data in a first-type transmission mode, a first downlink control channel sent by an access network device, where the first downlink control channel carries first downlink control information, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data; and detecting, by the terminal, the first downlink control information on the first downlink control channel.

16 Claims, 12 Drawing Sheets

(51) Int. Cl.
*H04L 1/18* (2006.01)
*H04W 76/27* (2018.01)
*H04L 5/00* (2006.01)
*H04W 72/04* (2009.01)
*H04W 88/10* (2009.01)

(52) U.S. Cl.
CPC ........... *H04L 5/0092* (2013.01); *H04W 24/08* (2013.01); *H04W 72/042* (2013.01); *H04W 76/27* (2018.02); *H04W 88/10* (2013.01)

(58) Field of Classification Search
CPC ..... H04W 76/27; H04W 52/02; H04W 24/08; H04W 72/042; H04W 88/10
See application file for complete search history.

(56) References Cited

U.S. PATENT DOCUMENTS

| | | | | |
|---|---|---|---|---|
| 2018/0368117 | A1* | 12/2018 | Ying | H04L 5/0044 |
| 2020/0383089 | A1* | 12/2020 | Goto | H04L 1/1812 |
| 2021/0160016 | A1* | 5/2021 | Takeda | H04W 28/04 |

OTHER PUBLICATIONS

TSG-RAN WG1:"LS on NR UL SPS / UL transmission without UL grant", 3GPP TSG-RAN WG1 Meeting #AH_NR2 R1-1711686, Qingdao, P.R. China Jun. 27-30, 2017, total 4 pages.

Huawei et al: "UL data transmissionprocedure with and without UL grant",3GPP Draft; R1-1717091,Oct. 2, 2017 (Oct. 2, 2017), XP051352197,total 18 pages.

Ericsson, "Grant Free and Semi-Persistent Scheduling in NR",3GPP TSG-RAN WG2 #AH Tdoc R2-1707174,Qingdao, P.R. of China, Jun. 27-29, 2017,total 3 pages.

InterDigital:"SPS and Grant-free operation for NR", 3GPP TSG-RAN WG2#NR AdHoc#2 R2-1706687, Qingdao, China, Jun. 27-29, 2017. total 3 pages.

NTT Docomo et al:"Overall solutions for UL grant free transmission",3GPP Draft; R1-1711111,Jun. 26, 2017 (Jun. 26, 2017). XP051300311,total 8 pages.

Ericsson:"On HARQ Retransmission for SPS/Grant-Free", 3GPP TSG RAN WG1 NR Ad-Hoc#2, R1-1711505, Qingdao, P.R. China, Jun. 27-30, 2017. total 3 pages.

Nokia et al: "UE identification and HARQ for URLLC UL grant-free",3GPP Draft; R1-1710994,Jun. 26, 2017 (Jun. 26, 2017), XP051300194,total 6 pages.

Samsung:"Procedures for Grant-Free UL Transmissions", 3GPP TSG RAN WG1 NR Ad-Hoc#2, R1-1710723, Qingdao, P.R. China, Jun. 27-30, 2017. total 3 pages.

* cited by examiner

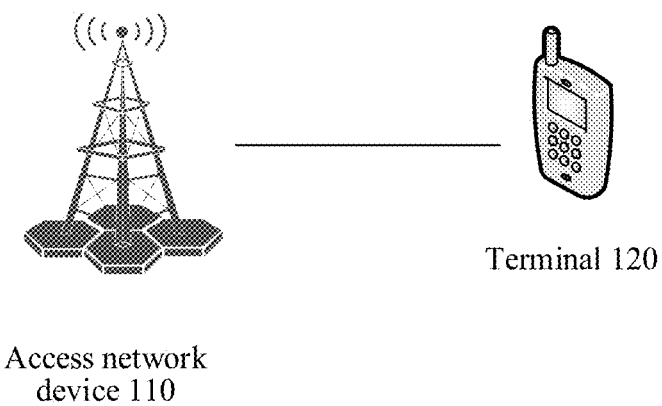

Terminal 120

Access network device 110

FIG. 1

| A terminal monitors, after completing initial transmission of first uplink data in a first-type transmission mode, a first downlink control channel sent by an access network device, where the first downlink control channel carries first downlink control information that is of the first uplink data and that is sent, by the access network device when the terminal operates in the first-type transmission mode, to the terminal, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data | ~ S210 |

| The terminal detects the first downlink control information on the monitored first downlink control channel | ~ S220 |

FIG. 2

```
┌─────────────────────────────────────────────────────────────────────┐
│   A terminal monitors, on a first resource, a first downlink control channel sent by  │
│    an access network device, where the first resource includes at least one of the    │
│      following: a first core set, a first bandwidth part, a first frequency, a first beam, │
│      and a time domain resource of a first length, the first downlink control channel │
│       carries first downlink control information that is of transmitted first uplink data │
│       and that is sent, when the terminal operates in a first-type transmission mode or a │
│     third-type transmission mode, to the terminal, a first transmission type, that is, the │
│            first-type transmission mode includes performing grant-free uplink data    │
│         transmission based on radio resource control configuration signaling or based on │
│              radio resource control reconfiguration signaling and not based on layer 1 │
│             signaling, a third transmission type, that is, the third-type transmission mode │── S810
│      includes performing grant-free uplink data transmission based on radio resource  │
│        control configuration signaling or based on radio resource control reconfiguration │
│             signaling and based on a configuration parameter modified by using layer 1 │
│              signaling, and the first downlink control information includes HARQ feedback │
│         information for first uplink data sent by the terminal in the first-type transmission │
│         mode or the third-type transmission mode, retransmission scheduling information │
│              for the first uplink data, or scheduling information for second uplink data │
└─────────────────────────────────────────────────────────────────────┘
                                         │
                                         ▼
┌─────────────────────────────────────────────────────────────────────┐
│     The terminal monitors, on a second resource, a second downlink control channel   │
│    sent by the access network device, where the second resource includes at least one │
│       of the following: a second core set, a second bandwidth part, a second frequency, │
│          a second beam, and a time domain resource of a second length, the second     │
│           control channel carries transmitted second downlink control information that is │
│             sent, when the terminal operates in a second-type transmission mode, to the │
│            terminal, the second-type transmission mode includes performing grant-free │
│         uplink data transmission based on radio resource control configuration signaling │── S820
│              or based on radio resource control reconfiguration signaling and based on │
│             activation or deactivation performed by using layer 1 signaling, and the second │
│            downlink control information includes at least one of the following information: │
│         information for activating the terminal to transmit third uplink data in a grant-free │
│          mode, information for deactivating the terminal to transmit the third uplink data in │
│            a grant-free mode, HARQ feedback information for the third uplink data, and │
│              information for instructing the terminal to retransmit the third uplink data │
└─────────────────────────────────────────────────────────────────────┘
                                         │
                                         ▼
┌─────────────────────────────────────────────────────────────────────┐
│      The terminal detects the first downlink control information from the monitored first │── S830
│                              downlink control channel                                 │
└─────────────────────────────────────────────────────────────────────┘
                                         │
                                         ▼
┌─────────────────────────────────────────────────────────────────────┐
│       The terminal detects the second downlink control information from the monitored │── S840
│                          second downlink control channel                              │
└─────────────────────────────────────────────────────────────────────┘

COMMUNICATION METHOD, ACCESS NETWORK DEVICE, AND TERMINAL

CROSS-REFERENCE TO RELATED APPLICATIONS

This application is a continuation of International Application No. PCT/CN2018/099832, filed on Aug. 10, 2018, which claims priority to Chinese Patent Application No. 201710687952.9, filed on Aug. 11, 2017, the disclosures of which are incorporated herein by reference in their entireties.

TECHNICAL FIELD

This application relates to the communications field, and more specifically, to a communication method, an access network device, and a terminal.

BACKGROUND

In a communications network, such as a new radio (NR) communications network, a conventional scheduling procedure of uplink data is that a terminal first sends a scheduling request, and after receiving the scheduling request, an access network device sends a scheduling grant to the terminal. After receiving the scheduling grant, the terminal needs to prepare the uplink data based on information in the scheduling grant for a period of time before sending the uplink data.

That is, the conventional scheduling procedure of the uplink data includes a time for the terminal to send the scheduling request and a time for the terminal to prepare the uplink data based on the scheduling grant. In this way, a latency is increased, which is unfavorable to a low latency requirement of some services, for example, an ultra-reliable and low-latency communication (URLLC) service.

Based on the foregoing reason, a scheduling-free manner may be used in the communications network. For example, the access network device may semi-persistently pre-configure an uplink resource for the terminal. The terminal can directly schedule the configured uplink resource to send uplink data provided that the terminal has the uplink data, thereby reducing a delay. In the technology, because the access network device does not need to deliver uplink (UL) grant information, uplink data transmission is named grant-free uplink data transmission.

Currently, it is proposed in NR communication that a grant-free uplink data transmission type may be used. For example, in a Type 1, the terminal performs uplink data transmission based on only a configuration of radio resource control (RRC) signaling, and does not need to perform uplink data transmission based on layer (L) 1 signaling; in a Type 2, the terminal performs uplink data transmission based on a configuration of RRC signaling and L1 signaling, where the L1 signaling is used to activate or deactivate grant-free uplink data transmission; and in a Type 3, the terminal performs uplink data transmission based on a configuration of RRC signaling and L1 signaling, where the L1 signaling is used to modify a parameter configured by using the RRC signaling. The RRC signaling configures a resource used when the terminal performs grant-free uplink data transmission.

It is proposed in NR that the grant-free uplink data transmission type can be used. However, it is not proposed about how the terminal monitors a downlink control channel to obtain downlink control information (DCI), for example, a hybrid automatic repeat request (HARD) message of the uplink data transmitted by the terminal by using the grant-free uplink data transmission type, corresponding to the uplink data transmitted by the terminal by using the grant-free uplink data transmission type.

In other words, in the NR communications system, how the terminal monitors the downlink control channel to obtain the downlink control information corresponding to the uplink data transmitted by using the grant-free uplink data transmission type is an urgent technical problem that needs to be resolved.

SUMMARY

This application provides a communication method, an access network device, and a terminal, so that the terminal can monitor a downlink control channel corresponding to uplink data transmitted by using a grant-free uplink data transmission type.

According to a first aspect, this application provides a communication method. The communication method includes: monitoring, by a terminal after completing initial transmission of first uplink data in a first-type transmission mode, a first downlink control channel sent by an access network device, where the first downlink control channel carries first downlink control information that is sent, by the access network device when the terminal operates in the first-type transmission mode, to the terminal, the first-type transmission mode includes performing grant-free uplink data transmission based on radio resource control configuration signaling or based on radio resource control reconfiguration signaling and not based on layer (L) 1 signaling, and the first downlink control information includes HARQ feedback information for the first uplink data, retransmission scheduling information for the first uplink data, or scheduling information for second uplink data; and detecting, by the terminal, the first downlink control information on the first downlink control channel.

It should be understood that the monitoring, by a terminal after completing initial transmission of first uplink data in a first-type transmission mode, a first downlink control channel sent by an access network device described herein further includes: skipping monitoring, by the terminal before completing the initial transmission of the first uplink data in the first-type transmission mode, the first downlink control information sent by the access network device.

In the communication method, the terminal may monitor, after completing the initial transmission of the first uplink data in the first-type transmission mode, the first downlink control channel sent by the access network device, to further obtain the first downlink control information, thereby facilitating communication reliability between the terminal and the access network device.

In addition, the terminal monitors, only after completing the initial transmission of the first uplink data in the first-type transmission mode, the first downlink control channel sent by the access network device, and does not need to perform monitoring before completing the initial transmission, so that energy consumption of the terminal can be reduced.

In one embodiment, the communication method further includes: receiving, by the terminal, first information sent by the access network device, where the first information is used to instruct the terminal to monitor the first downlink control channel after completing the initial transmission of the first uplink data in the first-type transmission mode.

The monitoring, by a terminal after completing initial transmission of first uplink data in a first-type transmission mode, a first downlink control channel sent by an access network device includes: monitoring, by the terminal based on an instruction of the first information after completing the initial transmission of the first uplink data in the first-type transmission mode, the first downlink control channel sent by the access network device.

That is, the terminal monitors, based on the first information sent by the access network device after the terminal completes the initial transmission of the first uplink data in the first-type transmission mode, the first downlink control channel sent by the access network device.

In one embodiment, the terminal may configure the capability according to stipulation in a protocol, that is, monitor, after completing the initial transmission of the first uplink data in the first-type transmission mode, the first downlink control channel sent by the access network device.

In one embodiment, the communication method further includes: switching, by the terminal, from the first-type transmission mode to a third-type transmission mode at a first moment after the terminal monitors the first downlink control channel, where the third-type transmission mode includes performing grant-free uplink data transmission based on radio resource control configuration signaling or based on radio resource control reconfiguration signaling and based on a configuration parameter modified by using L1 signaling.

In one embodiment, the communication method further includes: receiving, by the terminal, second information sent by the access network device, where the second information is used to indicate a first time interval, and the first time interval is a time interval between a second moment at which the terminal detects the first downlink control information and the first moment, where the switching, by the terminal, from the first-type transmission mode to a third-type transmission mode at a first moment after the terminal monitors the first downlink control channel includes: switching, by the terminal, from the first-type transmission mode to the third-type transmission mode based on an indication of the second information at the first moment after the terminal monitors the first downlink control channel.

In one embodiment, the communication method further includes: sending, by the terminal, third information to the access network device, where the third information is used to indicate a minimum time used by the terminal to switch from the first-type transmission mode to the third-type transmission mode; and the first time interval is greater than or equal to the minimum time.

In one embodiment, the communication method further includes: switching, by the terminal from the first-type transmission mode to a third-type transmission mode after receiving grant-free area adjustment signaling or bandwidth part (BWP) adjustment signaling sent by the access network device, or receiving slot format indicator (SFI) adjustment signaling and adjusting a format of a slot based on an SFI adjustment signaling, where the third-type transmission mode includes performing grant-free uplink data transmission based on radio resource control configuration signaling or based on radio resource control reconfiguration signaling and based on a configuration parameter modified by using layer 1 signaling.

For example, after a slot format is semi-persistently configured as an uplink slot, if the terminal adjusts the uplink slot to a downlink slot or adjusts the downlink slot to the uplink slot based on the SFI adjustment signaling, the terminal may switch from the first-type transmission mode to the third-type transmission mode.

According to a second aspect, this application provides a communication method. The communication method includes: sending, by an access network device, first information to a terminal, where the first information is used to instruct the terminal to monitor a first downlink control channel after completing initial transmission of first uplink data in a first-type transmission mode, the first downlink control channel carries first downlink control information, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data; and sending, by the access network device, the first downlink control information on the first downlink control channel after receiving the initial transmission of the first uplink data.

In the communication method, the access network device indicates the first information to the terminal, to instruct the terminal to monitor, after completing the initial transmission of the first uplink data in the first-type transmission mode, the first downlink control channel sent by the access network device, so that energy consumption of the terminal can be reduced.

In one embodiment, the communication method further includes: sending, by the access network device, second information to the terminal, where the second information is used to indicate a first time interval, the first time interval is a time interval between a second moment at which the terminal detects the first downlink control information and a first moment at which the terminal switches from the first-type transmission mode to a third-type transmission mode, and the third-type transmission mode includes performing grant-free uplink data transmission based on radio resource control configuration signaling or based on radio resource control reconfiguration signaling and based on a configuration parameter modified by using L1 signaling.

In one embodiment, the communication method further includes: receiving, by the access network device, third information sent by the terminal, where the third information is used to indicate a minimum time used by the terminal to switch from the first-type transmission mode to the third-type transmission mode; and the first time interval is greater than or equal to the minimum time.

According to a third aspect, this application provides a communication method. The communication method includes: monitoring, by a terminal on a first resource, a first downlink control channel sent by an access network device, where the first resource includes at least one of the following: a first core set, a first bandwidth part, a first beam, and a time domain resource of a first length, the first downlink control channel carries first downlink control information that is sent, when the terminal operates in a first-type transmission mode or a third-type transmission mode, to the terminal, the first-type transmission mode includes performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode;

monitoring, by the terminal on a second resource, a second downlink control channel sent by the access network device, where the second resource includes at least one of the following: a second core set, a second bandwidth part, a second beam, and a time domain resource of a second length, the second control channel carries second downlink control information that is sent, when the terminal operates in a second-type transmission mode, to the terminal, the second-type transmission mode include s performing grant-free uplink data transmission based on radio resource control configuration signaling or based on radio resource control reconfiguration signaling and based on activation or deactivation performed by using layer 1 signaling, and the second downlink control information includes at least one of the following information: information for activating the terminal to transmit, in a grant-free mode, third uplink data to be sent by the terminal in the second-type transmission mode, information for deactivating the terminal to transmit the third uplink data in a grant-free mode, HARQ feedback information for the third uplink data, and information for instructing the terminal to retransmit the third uplink data;

detecting, by the terminal, the first downlink control information from the monitored first downlink control channel; and detecting, by the terminal, the second downlink control information from the monitored second downlink control channel.

In the communication method, the terminal monitors, on different resources, downlink control channels corresponding to uplink data transmitted by using different transmission types. This helps reduce complexity of monitoring, by the terminal, the downlink control channels corresponding to the uplink data of the transmission types.

The time domain resource of the first length may be a time domain symbol, a slot, or a minimum slot, and the time domain resource of the second length may be a time domain resource that is different from the time domain resource of the first length in the time domain symbol, the slot, and the minimum slot.

In one embodiment, the communication method further includes: receiving, by the terminal, first information sent by the access network device, where the first information is used to instruct the terminal to monitor the first downlink control channel on the first resource; and receiving, by the terminal, second information sent by the access network device, where the second information is used to instruct the terminal to monitor the second downlink control channel on the second resource.

The monitoring, by a terminal on a first resource, a first downlink control channel sent by an access network device includes: monitoring, by the terminal on the first resource indicated by the first information, the first downlink control channel sent by the access network device; and the monitoring, by the terminal on a second resource, a second downlink control channel sent by the access network device includes: monitoring, by the terminal on the second resource indicated by the second information, the second downlink control channel sent by the access network device.

In this embodiment, the terminal monitors the first downlink control channel and the second downlink control channel based on the resources indicated by the access network device. This helps improve communication flexibility.

In one embodiment, the first resource and the second resource may be configured on the terminal according to a protocol. In this way, signaling can be saved.

In one embodiment, the first downlink control information is downlink control information scrambled by using a cell radio network temporary identifier (C-RNTI) or a group RNTI or an identifier different from the C-RNTI, and the second downlink control information is downlink control information scrambled by using a semi-persistent scheduling (SPS) RNTI.

According to a fourth aspect, this application provides a communication method. The communication method includes: sending, by an access network device, first information to a terminal, where the first information is used to instruct the terminal to monitor a first downlink control channel on a first resource, the first resource include s at least one of the following: a first core set, a first bandwidth part, a first beam, and a time domain resource of a first length, the first downlink control channel carries first downlink control information sent when the terminal operates in a first-type transmission mode or a third-type transmission mode, the first-type transmission mode includes performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode; and sending, by the access network device, second information to the terminal, where the second information is used to instruct the terminal to monitor a second downlink control channel on a second resource, the second resource includes at least one of the following: a second core set, a second bandwidth part, a second beam, and a time domain resource of a second length, the second control channel includes second downlink control information sent when the terminal operates in a second-type transmission mode, the second-type transmission mode includes performing grant-free uplink data transmission based on radio resource control configuration signaling or based on radio resource control reconfiguration signaling and based on activation or deactivation performed by using layer 1 signaling, the second downlink control information includes at least one of the following information: information for activating the terminal to transmit, in a grant-free mode, third uplink data to be sent by the terminal in the second-type transmission mode, information for deactivating the terminal to transmit the third uplink data in a grant-free mode, HARQ feedback information for the third uplink data, and information for instructing the terminal to retransmit the third uplink data.

In this communication method, the access network device indicates, to the terminal, resources on which the first downlink control channel and the second downlink control channel are monitored. This helps improve communication flexibility.

The time domain resource of the first length may be a time domain symbol, a slot, or a minimum slot, and the time domain resource of the second length may be a time domain resource that is different from the time domain resource of the first length in the time domain symbol, the slot, and the minimum slot.

In one embodiment, the first downlink control information is downlink control information scrambled by using a C-RNTI or a group-RNTI or an identifier that is different from the C-RNTI, and the second downlink control information is downlink control information scrambled by using an SPS RNTI.

According to a fifth aspect, this application provides a terminal. The terminal includes a module configured to perform the communication method in any one of the first aspect or the embodiments of the first aspect. The module included in the terminal may be implemented in a software and/or hardware manner.

According to a sixth aspect, this application provides an access network device. The access network device includes a module configured to perform the communication method in any one of the second aspect or the embodiments of the second aspect. The module included in the access network device may be implemented in a software and/or hardware manner.

According to a seventh aspect, this application provides a terminal. The terminal includes a module configured to perform the communication method in any one of the third aspect or the embodiments of the third aspect. The module included in the terminal may be implemented in a software and/or hardware manner.

According to an eighth aspect, this application provides an access network device. The access network device includes a module configured to perform the communication method in any one of the fourth aspect or the embodiments of the fourth aspect. The module included in the access network device may be implemented in a software and/or hardware manner.

According to a ninth aspect, this application provides a terminal. The terminal includes a processor, a receiver, and a transmitter. The processor is configured to execute a program. When the processor executes code, the processor, the receiver, and the transmitter implement the communication method in any one of the first aspect or the embodiments of the first aspect.

In one embodiment, the terminal may further include a memory, and the memory is configured to store the code executed by the processor.

According to a tenth aspect, this application provides an access network device. The access network device includes a processor, a transmitter, and a receiver. The processor is configured to execute a program. When the processor executes code, the processor, the transmitter, and the receiver implement the communication method in any one of the second aspect or the embodiments of the second aspect.

In one embodiment, the access network device may further include a memory, and the memory is configured to store the code executed by the processor.

According to an eleventh aspect, this application provides a terminal. The terminal includes a processor, a receiver, and a transmitter. The processor is configured to execute a program. When the processor executes code, the processor, the receiver, and the transmitter implement the communication method in any one of the third aspect or the embodiments of the third aspect.

In one embodiment, the terminal may further include a memory, and the memory is configured to store the code executed by the processor.

According to a twelfth aspect, this application provides an access network device. The access network device includes a processor, a transmitter, and a receiver. The processor is configured to execute a program. When the processor executes code, the processor, the transmitter, and the receiver implement the communication method in any one of the fourth aspect or the embodiments of the fourth aspect.

In one embodiment, the access network device may further include a memory, and the memory is configured to store the code executed by the processor.

According to a thirteenth aspect, this application provides a computer-readable storage medium. The computer-readable storage medium stores program code to be executed by a terminal. The program code includes an instruction used to perform the communication method in any one of the first aspect or the embodiments of the first aspect.

According to a fourteenth aspect, this application provides a computer-readable storage medium. The computer-readable storage medium stores program code to be executed by an access network device. The program code includes an instruction used to perform the communication method in any one of the second aspect or the embodiments of the second aspect.

According to a fifteenth aspect, this application provides a computer-readable storage medium. The computer-readable storage medium stores program code to be executed by a terminal. The program code includes an instruction used to perform the communication method in any one of the third aspect or the embodiments of the third aspect.

According to a sixteenth aspect, this application provides a computer-readable storage medium. The computer-readable storage medium stores program code to be executed by an access network device. The program code includes an instruction used to perform the communication method in any one of the fourth aspect or the embodiments of the fourth aspect.

According to a seventeenth aspect, this application provides a computer program product including an instruction. When the computer program product runs on a terminal, the terminal device is enabled to perform the communication method in any one of the first aspect or the embodiments of the first aspect.

According to an eighteenth aspect, this application provides a computer program product including an instruction. When the computer program product runs on an access network device, the access network device is enabled to perform the communication method in any one of the second aspect or the embodiments of the second aspect.

According to a nineteenth aspect, this application provides a computer program product including an instruction. When the computer program product runs on a terminal, the terminal is enabled to perform the communication method in any one of the third aspect or the embodiments of the third aspect.

According to a twentieth aspect, this application provides a computer program product including an instruction. When the computer program product runs on an access network device, the access network device is enabled to perform the communication method in any one of the fourth aspect or the embodiments of the fourth aspect.

According to a twenty-first aspect, a system chip is provided. The system chip includes an input/output interface, at least one processor, at least one memory, and a bus, where the at least one memory is configured to store an instruction, and the at least one processor is configured to invoke the instruction in the at least one memory, to perform operations in the communication method in the foregoing aspects.

BRIEF DESCRIPTION OF DRAWINGS

FIG. 1 is a schematic structural diagram of a system in an application scenario of a communication method according to an embodiment of this application;

FIG. 2 is a schematic flowchart of a communication method according to an embodiment of this application;

FIG. 8 is a schematic flowchart of a communication method according to another embodiment of this application;

DESCRIPTION OF EMBODIMENTS

Figure 3:
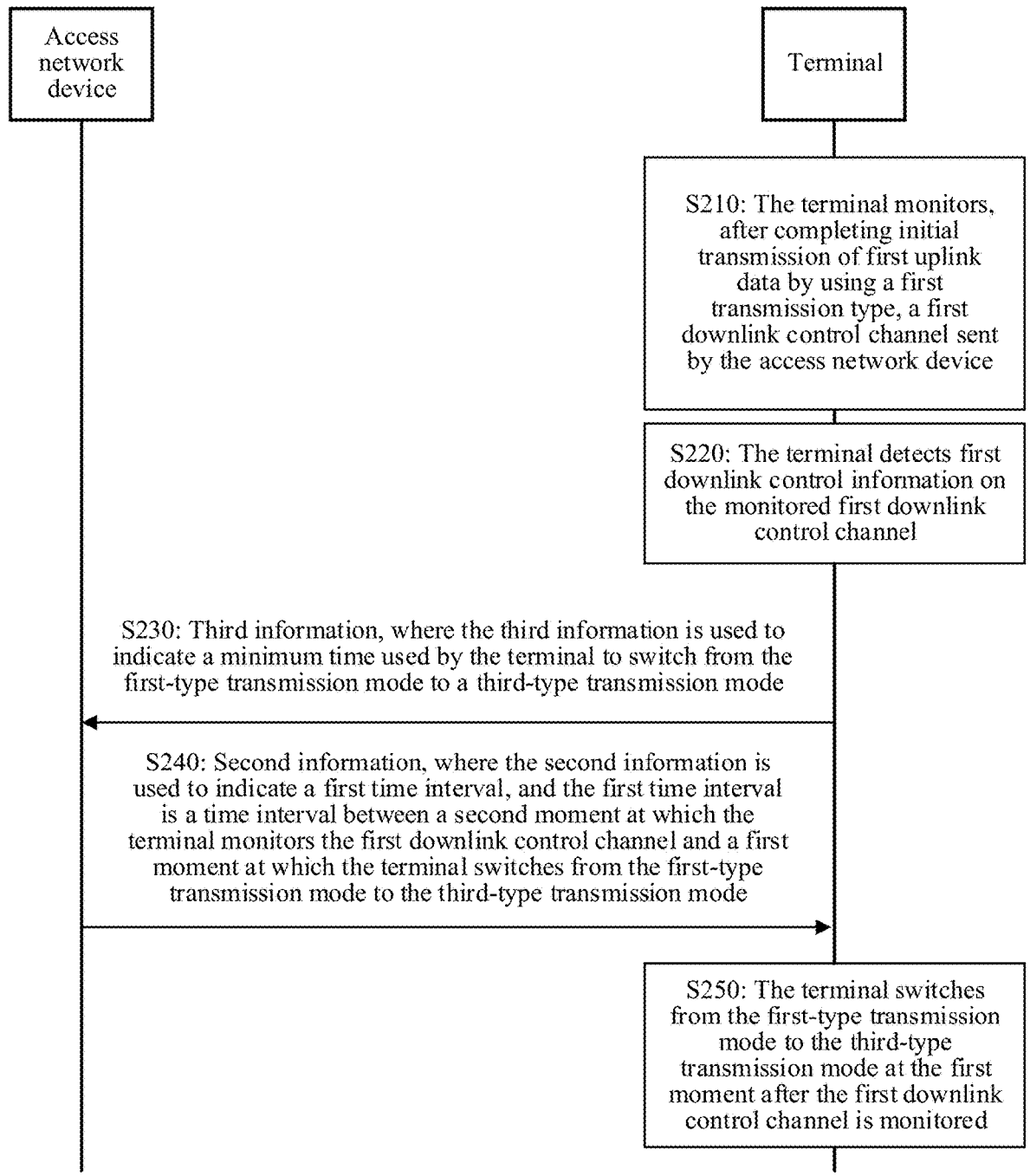
FIG. 3 is a schematic flowchart of a communication method according to another embodiment of this application.

The following describes technical solutions of this application with reference to accompanying drawings.

FIG. 1 is a schematic architectural diagram of a communications system to which an embodiment of this application is applied. As shown in FIG. 1, the communications system includes a radio access network device 110 and at least one terminal (for example, a terminal 120 in FIG. 1).

The terminal 120 may be connected to the access network device 110 in a wireless manner. The terminal 120 may be at a fixed location, or may be mobile.

FIG. 1 is merely a schematic diagram. The communications system may further include another network device, and for example, may further include a wireless relay device and a wireless backhaul device, which are not drawn in FIG. 1. A quantity of access network devices and a quantity of terminals in the communications system are not limited in this embodiment of this application.

The access network device 110 is an access device used by the terminal 120 to access the communications system, and may be a NodeB, an eNodeB, a base station in a 5G mobile communications system, a base station in a future mobile communications system, an access node in a Wi-Fi system, or the like. A specific technology and a specific device form used by the access network device 110 are not limited in this embodiment of this application.

The terminal 120 may also be referred to as a terminal, user equipment (UE), a mobile station (MS), a mobile terminal (MT), or the like.

The terminal 120 may be a mobile phone, a tablet computer (Pad), a computer with a wireless receiving and sending function, customer-premises equipment (CPE), a virtual reality (VR) terminal device, an augmented reality (AR) terminal device, a wireless terminal in industrial control, a wireless terminal in unmanned driving (self driving), a wireless terminal in remote surgery, a wireless terminal in a smart grid, a wireless terminal in transportation safety, a wireless terminal in a smart city, a wireless terminal in smart home, or the like.

The access network device 110 and the terminal 120 may be deployed on land, including indoor or outdoor devices, handheld devices, or in-vehicle devices, or may be deployed on a water surface; or may be deployed on an airplane, a balloon, or an artificial satellite in the air. An application scenario of the access network device 110 and an application scenario of the terminal 120 are not limited in this embodiment of this application.

Communication between the access network device 110 and the terminal 120 and communication between the terminal devices 120 may be performed by using a licensed spectrum, or may be performed by using an unlicensed spectrum, or may be performed by using both a licensed spectrum and an unlicensed spectrum.

Communication between the access network device 110 and the terminal 120 and communication between the terminals 120 may be performed by using a spectrum below 6 gigahertz (GHz), or may be performed by using a spectrum above 6 GHz, or may be performed by using both a spectrum below 6 GHz and a spectrum above 6 GHz. A spectrum resource used between the access network device 110 and the terminal 120 is not limited in this embodiment of this application.

FIG. 2 is a schematic flowchart of a communication method according to an embodiment of this application. It should be understood that FIG. 2 shows operations of the communication method, but these operations are merely examples. In this embodiment of this application, other operations or variations of the operations in FIG. 2 may further be performed. In addition, the operations in FIG. 2 may be performed in a sequence different from that presented in FIG. 2, and possibly not all operations in FIG. 2 need to be performed.

The following capability is configured for a terminal according to a protocol: monitoring, after completing initial transmission of first uplink data in a first-type transmission mode, a first downlink control channel sent by an access network device.

The first-type transmission mode includes: The terminal performs uplink data transmission based on only a configuration of RRC signaling, and does not need to perform uplink data transmission based on L1 signaling. The first uplink data is uplink data transmitted in the first-type transmission mode. When the terminal transmits the first uplink data, downlink control information sent by the access network device is referred to as first downlink control information. The first downlink control channel is a downlink control channel that carries the first downlink control information.

The first downlink control information includes HARQ feedback information for the first uplink data, retransmission scheduling information for the first uplink data, or scheduling information for second uplink data.

The HARQ feedback information may be specifically an acknowledgment (ACK) or a negative acknowledgment (NACK).

The second uplink data is uplink data whose content is different from that of the first uplink data.

Operation S210: The terminal monitors, after completing the initial transmission of the first uplink data in the first-type transmission mode, the first downlink control channel sent by the access network device.

The first downlink control channel may be a physical downlink control channel (PDCCH).

Operation S220: The terminal detects the first downlink control information on the monitored first downlink control channel.

In one embodiment, the access network device may scramble the first downlink control information by using a C-RNTI or an identifier different from the C-RNTI. Correspondingly, the terminal may perform blind detection, by using the C-RNTI or the identifier different from the C-RNTI, on the monitored downlink control channel, to obtain the first downlink control information.

In the communication method in this embodiment of this application, the terminal can monitor the first downlink control channel, to detect the first downlink control information on the first downlink control channel. This helps improve reliability of communication between the terminal and the access network device. In addition, in the communication method, the terminal does not need to monitor the first downlink control channel before transmitting the first uplink data, so that energy consumption of the terminal can be reduced.

A communication method in another embodiment of this application, as shown in FIG. 3, may further include operation S250: The terminal switches from the first-type transmission mode to a third-type transmission mode at a first moment after the terminal monitors the first downlink control channel, where the third-type transmission mode includes performing grant-free uplink data transmission based on radio resource control configuration signaling or based on radio resource control reconfiguration signaling and based on a configuration parameter modified by using L1 signaling.

The terminal switches from the first-type transmission mode to the third-type transmission mode, so that the terminal can receive configuration information that is sent by the access network device by using L1 signaling and that is for modifying a parameter in a grant-free transmission type.

The communication method in the another embodiment of this application, as shown in FIG. 3, may further include operation S240: The access network device sends second information to the terminal, where the second information is used to indicate a first time interval, and the first time interval is a time interval between a second moment at which the terminal detects the first downlink control information and the first moment.

Correspondingly, the terminal receives the second information sent by the access network device. In this case, operation S250, to be specific, the switching, by the terminal, from the first-type transmission mode to a third-type transmission mode at a first moment after the terminal monitors the first downlink control channel includes: switching, by the terminal, from the first-type transmission mode to the third-type transmission mode based on an indication of the second information at the first moment after the terminal monitors the first downlink control channel.

It should be noted that even though a downlink control channel that carries the second information is received, if the terminal does not correctly parse the second information from the downlink control channel before transmitting the first uplink data in the first-type transmission mode, the terminal will still not switch from the first-type transmission mode to the third-type transmission mode.

The communication method in the another embodiment of this application, as shown in FIG. 3, may further include operation S230: The terminal sends third information to the access network device, where the third information is used to indicate a minimum time used by the terminal to switch from the first-type transmission mode to the third-type transmission mode. Correspondingly, the access network device receives the third information sent by the terminal. In this case, the first time interval indicated by the second information sent by the access network device is greater than or equal to the minimum time indicated by the third information.

In other words, after receiving the third information sent by the terminal, the access network device may send the second information to the terminal based on the third information. In other words, it needs to be ensured that the first time interval is greater than or equal to the minimum time indicated by the third information.

Figure 4:
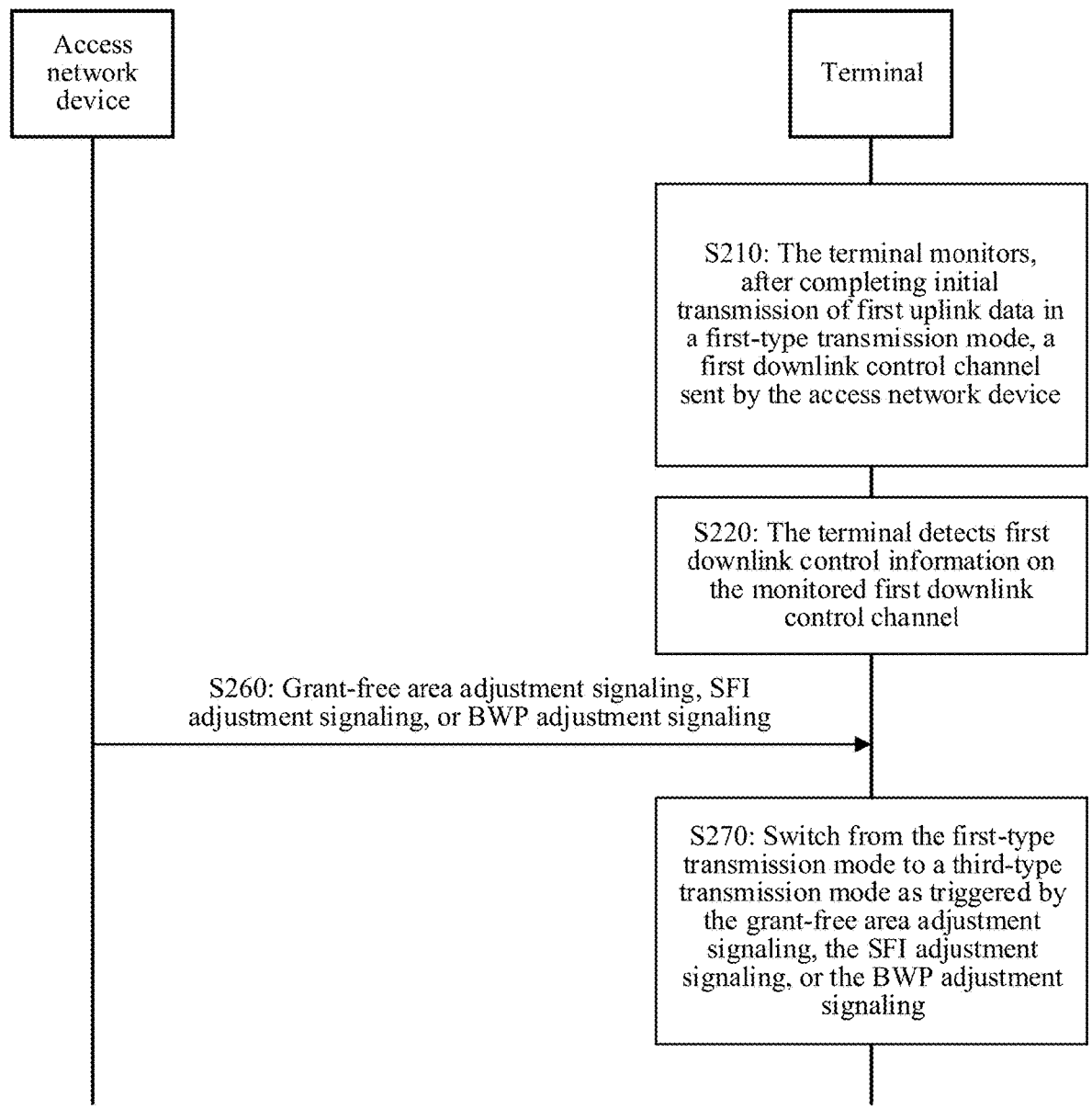
FIG. 4 is a schematic flowchart of a communication method according to another embodiment of this application.

A communication method in another embodiment of this application, as shown in FIG. 4, may further include operation S260: The access network device sends grant-free area adjustment signaling or SFI adjustment signaling or BWP adjustment signaling to the terminal, and correspondingly, the terminal receives the grant-free area adjustment signaling or the SFI adjustment signaling or the BWP adjustment signaling sent by the access network device; and operation S270: After being triggered by using the grant-free area adjustment signaling or the BWP adjustment signaling, or adjusting a format of a slot based on an SFI adjustment signaling, the terminal switches from the first-type transmission mode to the third-type transmission mode.

For example, after a slot format is semi-persistently configured as an uplink slot, if the terminal adjusts the uplink slot to a downlink slot based on the SFI adjustment signaling, the terminal may switch from the first-type transmission mode to the third-type transmission mode.

In one embodiment, the embodiment shown in FIG. 3 may also include operations S260 and S270.

Figure 5:
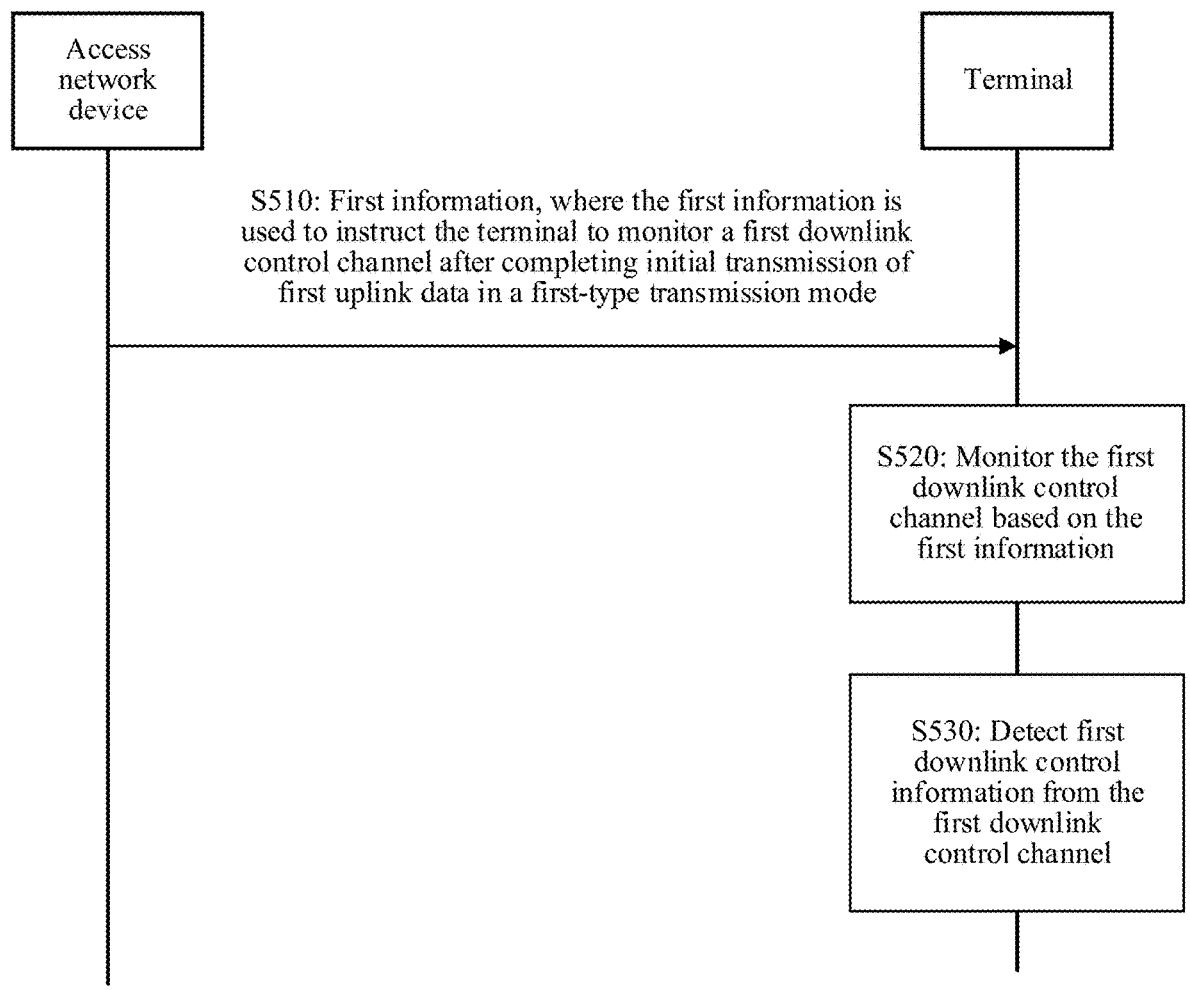
FIG. 5 is a schematic flowchart of a communication method according to another embodiment of this application.

FIG. 5 is a schematic flowchart of a communication method according to an embodiment of this application. It should be understood that FIG. 5 shows operations of the communication method, but these operations are merely examples. In this embodiment of this application, other operations or variations of the operations in FIG. 5 may further be performed. In addition, the operations in FIG. 5 may be performed in a sequence different from that presented in FIG. 5, and possibly not all operations in FIG. 5 need to be performed.

Operation S510: An access network device sends first information to a terminal, where the first information is used to instruct the terminal to monitor a first downlink control channel after completing initial transmission of first uplink data in a first-type transmission mode, the first downlink control channel carries first downlink control information, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data.

The first uplink data is uplink data transmitted in the first-type transmission mode. Downlink control information sent by the access network device when the terminal operates in the first-type transmission mode is referred to as the first downlink control information. The first downlink control channel is a downlink control channel that carries the first downlink control information.

The first downlink control channel may be a physical downlink control channel (PDCCH).

The access network device may send the first information to the terminal by using RRC signaling.

The access network device sends the first downlink control information on the first downlink control channel after receiving the initial transmission of the first uplink data.

Operation S520: The terminal monitors, based on an instruction of the first information after completing the initial transmission of the first uplink data in the first-type transmission mode, the first downlink control channel sent by the access network device.

Operation S530: The terminal detects the first downlink control information on the monitored first downlink control channel.

In one embodiment, the access network device may scramble the first downlink control information by using a C-RNTI or an identifier different from the C-RNTI. Correspondingly, the terminal may perform blind detection on the monitored downlink control channel by using the C-RNTI or the identifier different from the C-RNTI, to obtain the first downlink control information.

In the communication method, the access network device indicates the first information to the terminal, to instruct the terminal to monitor, after the terminal completes the initial transmission of the first uplink data in the first-type transmission mode, the first downlink control channel sent by the access network device, so that energy consumption of the terminal can be reduced.

Figure 6:
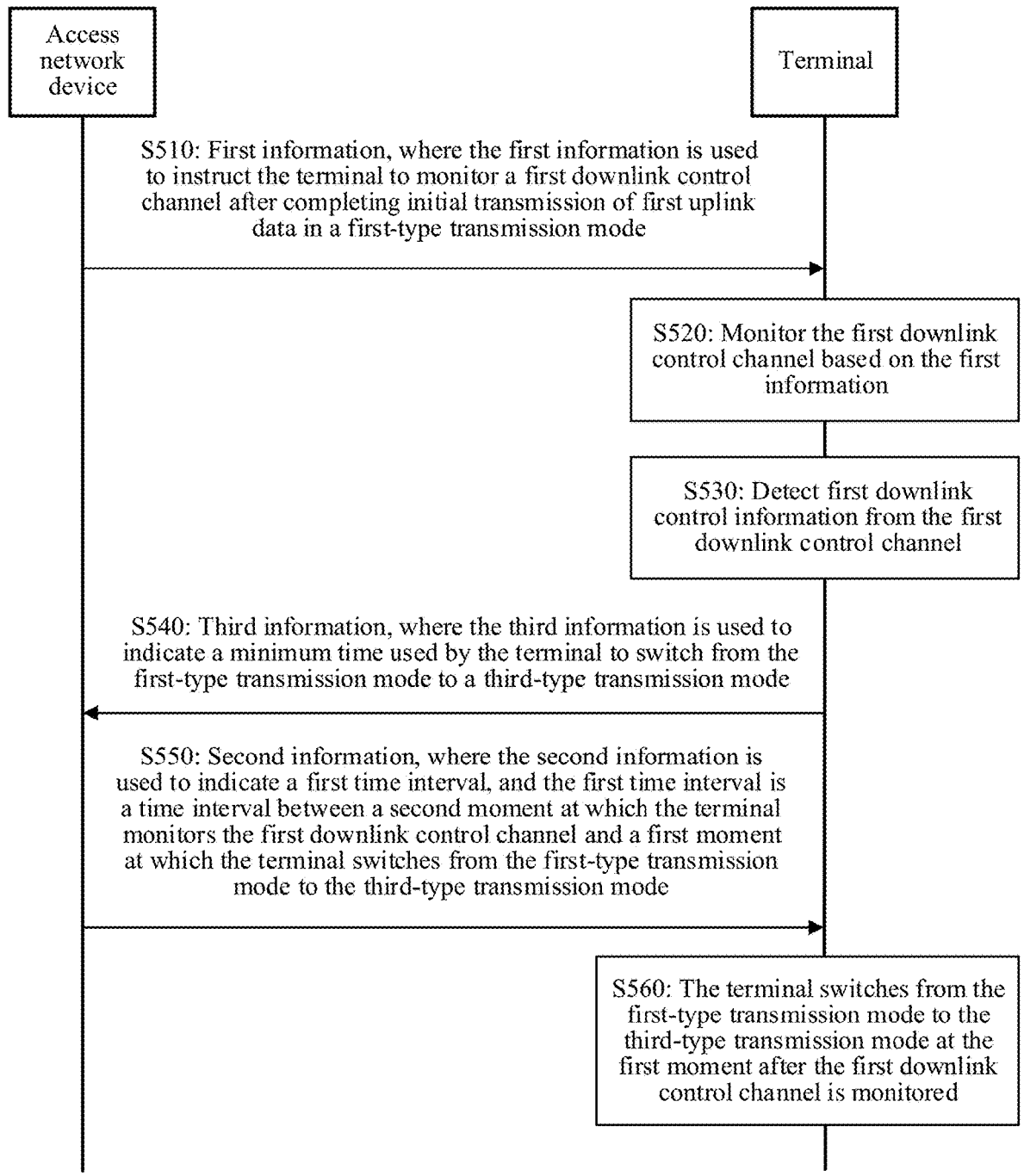
FIG. 6 is a schematic flowchart of a communication method according to another embodiment of this application.

A communication method in another embodiment of this application, as shown in FIG. 6, may further include operation S560: The terminal switches from the first-type transmission mode to a third-type transmission mode at a first moment after the terminal monitors the first downlink control channel, where the third-type transmission mode includes performing grant-free uplink data transmission based on radio resource control configuration signaling or based on radio resource control reconfiguration signaling and based on a configuration parameter modified by using L1 signaling.

The terminal switches from the first-type transmission mode to the third-type transmission mode, so that the terminal can receive configuration information that is sent by the access network device by using L1 signaling and that is for modifying a parameter in a grant-free transmission type.

The communication method in the another embodiment of this application, as shown in FIG. 6, may further include operation S550: The access network device sends second information to the terminal, where the second information is used to indicate a first time interval, and the first time interval is a time interval between a second moment at which the terminal detects the first downlink control information and the first moment at which the terminal switches from the first-type transmission mode to the third-type transmission mode.

Correspondingly, the terminal receives the second information sent by the access network device. In this case, operation S560, to be specific, the switching, by the terminal, from the first-type transmission mode to a third-type transmission mode at a first moment after the terminal monitors the first downlink control channel includes: switching, by the terminal, from the first-type transmission mode to the third-type transmission mode based on an indication of the second information at the first moment after the terminal monitors the first downlink control channel.

It should be noted that even though a downlink control channel that carries the second information is received, if the terminal does not correctly parse the second information from the downlink control channel before transmitting the first uplink data in the first-type transmission mode, the terminal will still not switch from the first-type transmission mode to the third-type transmission mode.

The communication method in the another embodiment of this application, as shown in FIG. 6, may further include operation S540: The terminal sends third information to the access network device, where the third information is used to indicate a minimum time used by the terminal to switch from the first-type transmission mode to the third-type transmission mode. Correspondingly, the access network device receives the third information sent by the terminal. In this case, the first time interval indicated by the second information sent by the access network device is greater than or equal to the minimum time indicated by the third information.

In other words, after receiving the third information sent by the terminal, the access network device may send the second information to the terminal based on the third information. In other words, it needs to be ensured that the first time interval is greater than or equal to the minimum time indicated by the third information.

Figure 7:
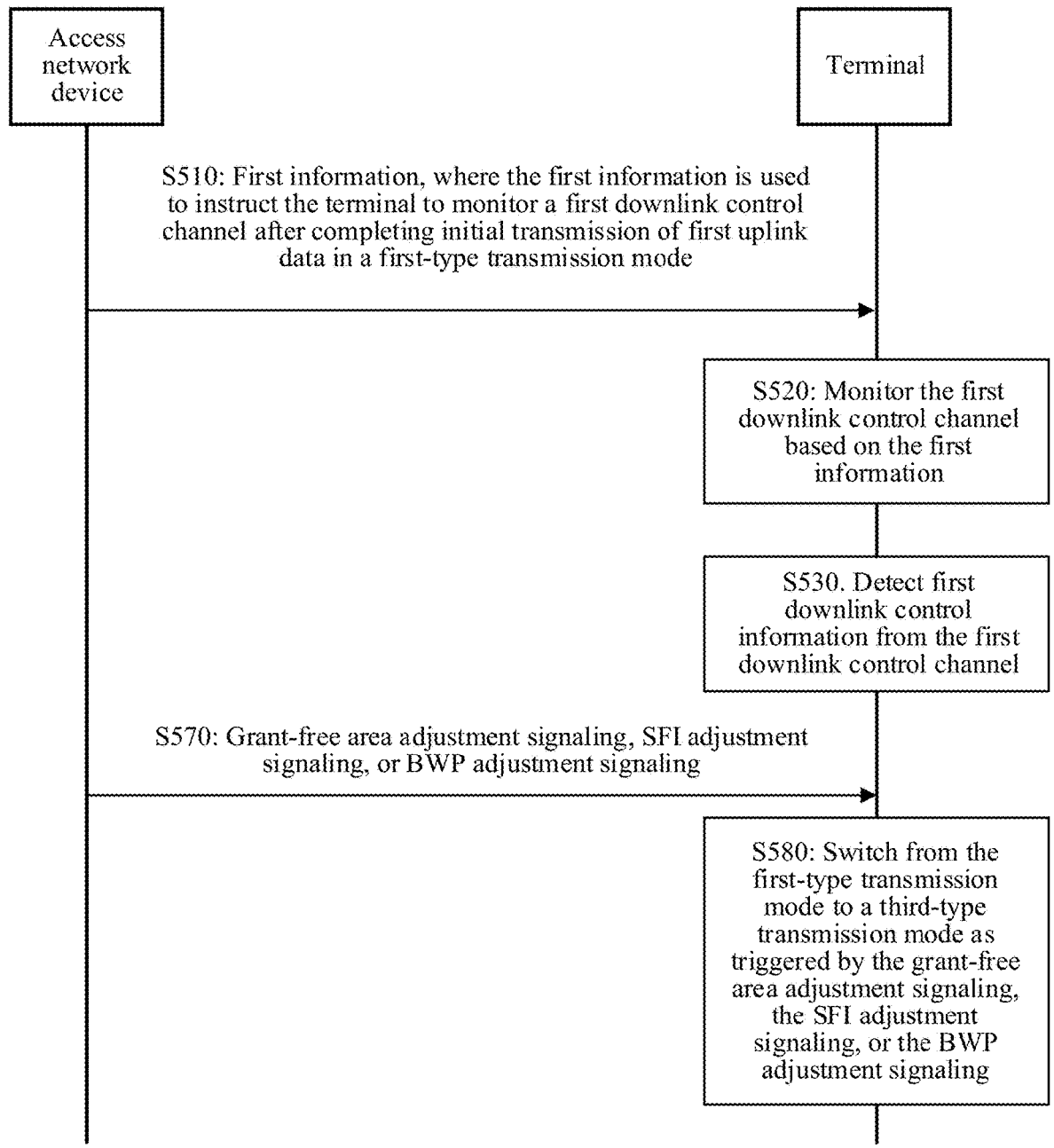
FIG. 7 is a schematic flowchart of a communication method according to another embodiment of this application.

A communication method in another embodiment of this application, as shown in FIG. 7, may further include operation S570: The access network device sends grant-free area adjustment signaling or SFI adjustment signaling or BWP adjustment signaling to the terminal, and correspondingly, the terminal receives the grant-free area adjustment signaling or the SFI adjustment signaling or the BWP adjustment signaling sent by the access network device; and operation S580: After being triggered by using the grant-free area adjustment signaling or the BWP adjustment signaling, or adjusting a format of a slot based on an SFI adjustment signaling, the terminal switches from the first-type transmission mode to the third-type transmission mode.

FIG. 8 is a schematic flowchart of a communication method according to another embodiment of this application. It should be understood that FIG. 8 shows operations of the communication method, but these operations are merely examples. In this embodiment of this application, other operations or variations of the operations in FIG. 8 may further be performed. In addition, the operations in FIG. 8 may be performed in a sequence different from that presented in FIG. 8, and possibly not all operations in FIG. 8 need to be performed.

The following capability is configured for a terminal according to a protocol: monitoring, on a first resource, a first downlink control channel sent by an access network device, where the first resource includes at least one of the following: a first core set, a first bandwidth part, a first beam, and a time domain resource of a first length, the first downlink control channel carries first downlink control information that is sent, when the terminal operates in a first-type transmission mode or a third-type transmission mode, to the terminal, the first-type transmission mode include s performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode.

The following capability is further configured for the terminal according to a protocol: monitoring, on a second resource, a second downlink control channel sent by the access network device, where the second resource includes at least one of the following: a second core set, a second bandwidth part, a second beam, and a time domain resource of a second length, the second control channel carries second downlink control information that is sent, when the terminal operates in a second-type transmission mode, to the terminal, the second-type transmission mode include s performing grant-free uplink data transmission based on radio resource control configuration signaling or based on radio resource control reconfiguration signaling and based on activation or deactivation performed by using layer 1 signaling, and the second downlink control information includes at least one of the following information: information for activating the terminal to transmit third uplink data in a grant-free mode, information for deactivating the terminal to transmit the third uplink data in a grant-free mode, HARQ feedback information for the third uplink data, and information for instructing the terminal to retransmit the third uplink data.

The time domain resource of the first length may be a time domain symbol, a slot, or a minimum slot, and the time domain resource of the second length may be a time domain resource that is different from the time domain resource of the first length in the time domain symbol, the slot, and the minimum slot.

Operation S810: The terminal monitors, on the first resource, the first downlink control channel sent by the access network device.

Operation S820: The terminal monitors, on the second resource, the second downlink control channel sent by the access network device.

Operation S830: The terminal detects the first downlink control information from the monitored first downlink control channel.

Operation S840: The terminal detects the second downlink control information from the monitored second downlink control channel.

In the communication method, the terminal monitors, on different resources, downlink control channels corresponding to uplink data transmitted by using different transmission types. This helps reduce complexity of monitoring, by the terminal, the downlink control channels corresponding to the uplink data of the transmission types.

In this embodiment of this application, the first downlink control information may be downlink control information scrambled by using a C-RNTI or a group RNTI or an identifier that is different from the C-RNTI, and the second downlink control information may be downlink control information scrambled by using an SP S RNTI.

Figure 9:
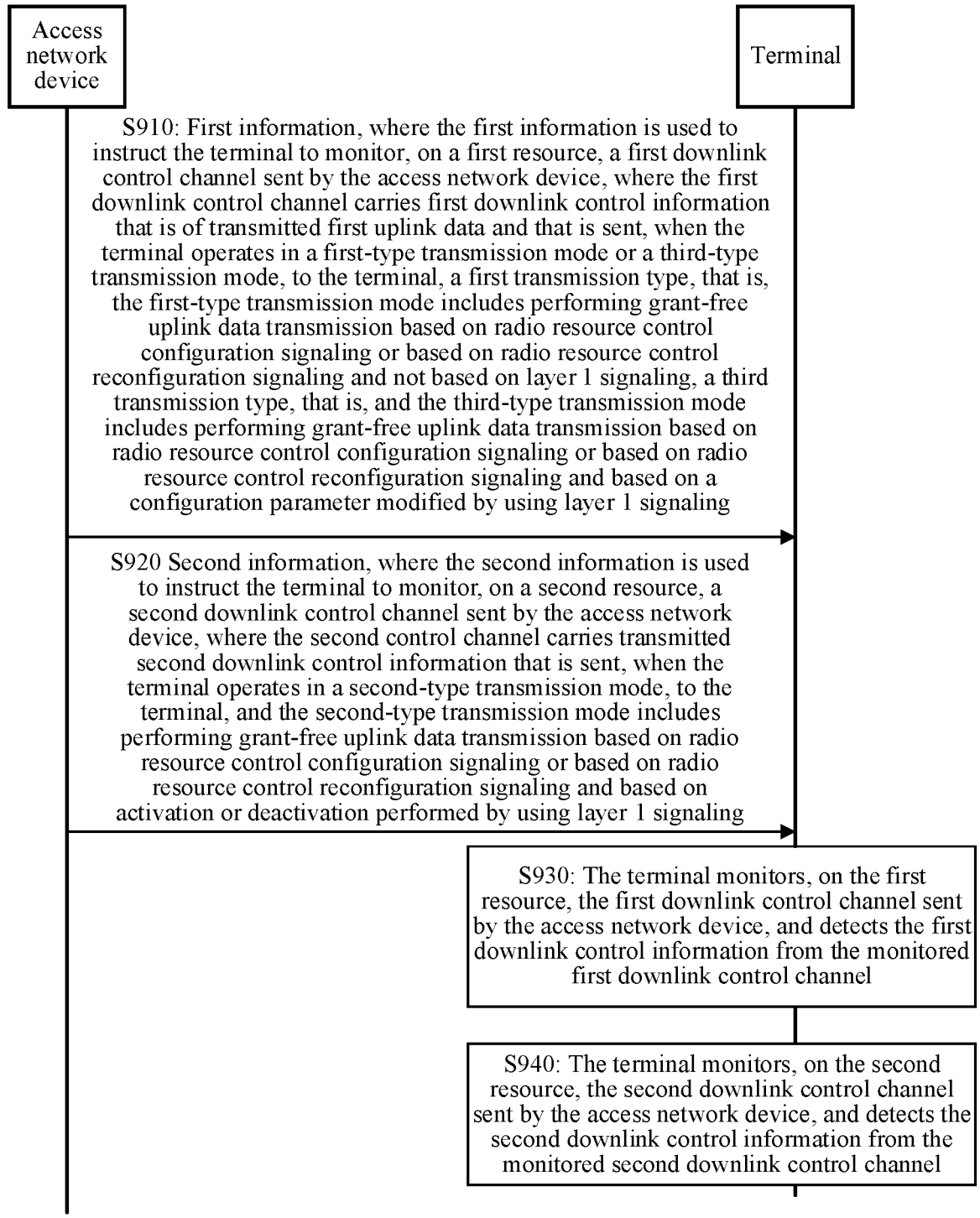
FIG. 9 is a schematic flowchart of a communication method according to another embodiment of this application.

FIG. 9 is a schematic flowchart of a communication method according to another embodiment of this application. It should be understood that FIG. 9 shows operations of the communication method, but these operations are merely examples. In this embodiment of this application, other operations or variations of the operations in FIG. 9 may further be performed. In addition, the operations in FIG. 9 may be performed in a sequence different from that presented in FIG. 9, and possibly not all operations in FIG. 9 need to be performed.

Operation S910: An access network device sends first information to a terminal, where the first information is used to instruct the terminal to monitor a first downlink control channel on a first resource, the first resource includes at least one of the following: a first core set, a first bandwidth part, a first beam, and a time domain resource of a first length, the first downlink control channel carries first downlink control information sent when the terminal operates in a first-type transmission mode or a third-type transmission mode, the first-type transmission mode includes performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode.

Correspondingly, the terminal receives the first information.

Operation S920: The access network device sends second information to the terminal, where the second information is used to instruct the terminal to monitor a second downlink control channel on a second resource, the second resource includes at least one of the following: a second core set, a second bandwidth part, a second beam, and a time domain resource of a second length, the second control channel includes second downlink control information sent when the terminal operates in a second-type transmission mode, the second-type transmission mode includes performing grant-free uplink data transmission based on radio resource control configuration signaling or based on radio resource control reconfiguration signaling and based on activation or deactivation performed by using layer 1 signaling, the second downlink control information includes at least one of the following information: information for activating the terminal to transmit third uplink data in a grant-free mode, information for deactivating the terminal to transmit the third uplink data in a grant-free mode, HARQ feedback information for the third uplink data, and information for instructing the terminal to retransmit the third uplink data.

Correspondingly, the terminal receives the second information.

Operation S930: The terminal monitors, on the first resource, the first downlink control channel sent by the access network device, and detects the first downlink control information from the monitored first downlink control channel.

Operation S940: The terminal monitors, on the second resource, the second downlink control channel sent by the access network device, and detects the second downlink control information from the monitored second downlink control channel.

In this communication method, the access network device indicates, to the terminal, resources on which the first downlink control channel and the second downlink control channel are monitored. This helps improve communication flexibility.

The time domain resource of the first length may be a time domain symbol, a slot, or a minimum slot, and the time domain resource of the second length may be a time domain resource that is different from the time domain resource of the first length in the time domain symbol, the slot, and the minimum slot.

In this embodiment of this application, the first downlink control information may be downlink control information scrambled by using a C-RNTI or a group-RNTI or an identifier that is different from the C-RNTI, and the second downlink control information is downlink control information scrambled by using an SPS RNTI.

Figure 10:
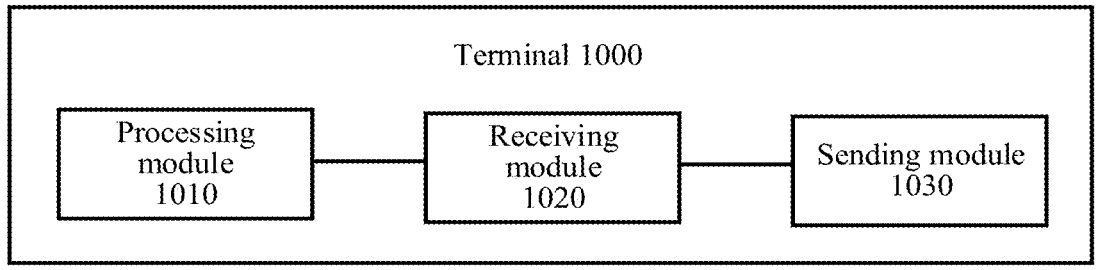
FIG. 10 is a schematic structural diagram of a terminal according to an embodiment of this application.

FIG. 10 is a schematic structural diagram of a terminal 1000 according to an embodiment of this application. It should be understood that the terminal 1000 shown in FIG. 10 is merely an example. The terminal in this embodiment of this application may further include another module or unit, or may include modules having functions similar to those of the modules in FIG. 10, or may not need to include all the module s in FIG. 10.

The terminal 1000 shown in FIG. 10 may perform operations performed by the terminal in the communication method shown in FIG. 2, FIG. 3, FIG. 4, FIG. 5, FIG. 6, or FIG. 7. Specifically, the terminal 1000 may include a processing module 1010:

The processing module 1010 is configured to monitor, after initial transmission of first uplink data is completed in a first-type transmission mode, a first downlink control channel sent by an access network device, where the first downlink control channel carries first downlink control information that is sent, by the access network device when the terminal operates in the first-type transmission mode, to the terminal, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data.

The processing module 1010 is further configured to detect the first downlink control information on the first downlink control channel.

The terminal may monitor, after completing the initial transmission of the first uplink data in the first-type transmission mode, the first downlink control channel sent by the access network device, to further obtain the first downlink control information, thereby facilitating communication reliability between the terminal and the access network device.

In addition, the terminal monitors, only after completing the initial transmission of the first uplink data in the first-type transmission mode, the first downlink control channel sent by the access network device, and does not need to perform monitoring before completing the initial transmission, so that energy consumption of the terminal can be reduced.

In one embodiment, the terminal 1000 further includes a receiving module 1020.

The receiving module 1020 is configured to receive the first information sent by the access network device, and the first information is used to instruct the terminal to monitor the first downlink control channel after the terminal completes initial transmission of the first uplink data in the first-type transmission mode.

The processing module 1010 is specifically configured to: monitor, based on an instruction of the first information after the initial transmission of the first uplink data is completed in the first-type transmission mode, the first downlink control channel sent by the access network device.

In one embodiment, the processing module 1010 is further configured to: switch from the first-type transmission mode to a third-type transmission mode at a first moment after the first downlink control channel is detected, where the third-type transmission mode includes performing grant-free uplink data transmission based on radio resource control configuration signaling or based on radio resource control reconfiguration signaling and based on a configuration parameter modified by using layer 1 signaling.

In one embodiment, the terminal 1000 further includes the receiving module 1020.

The receiving module 1020 is configured to: receive second information sent by the access network device, where the second information is used to indicate a first time interval, and the first time interval is a time interval between a second moment at which the terminal detects the first downlink control information and the first moment at which the terminal switches from the first-type transmission mode to the third-type transmission mode.

The processing module 1010 is specifically configured to: switch from the first-type transmission mode to the third-type transmission mode based on an indication of the second information at the first moment after the first downlink control channel is detected.

In one embodiment, the terminal 1000 may further include a sending module 1030, configured to: send third information to the access network device, where the third information is used to indicate a minimum time used by the terminal to switch from the first-type transmission mode to the third-type transmission mode.

The first time interval is greater than or equal to the minimum time.

In one embodiment, the processing module 1010 is further configured to: switch from the first-type transmission mode to a third-type transmission mode, after grant-free area adjustment signaling or BWP adjustment signaling sent by the access network device is received, or SFI adjustment signaling is received and a format of a slot is adjusted based on the SFI adjustment signaling, where the third-type transmission mode includes performing grant-free uplink data transmission based on radio resource control configuration signaling or based on radio resource control reconfiguration signaling and based on a configuration parameter modified by using layer 1 signaling.

Figure 11:
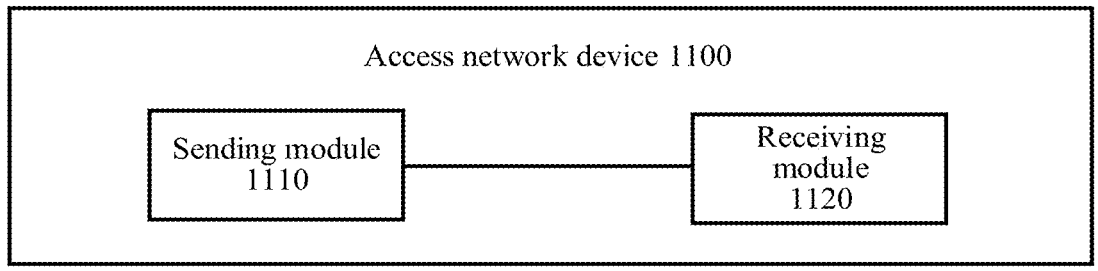
FIG. 11 is a schematic structural diagram of an access network device according to an embodiment of this application.

FIG. 11 is a schematic structural diagram of an access network device 1100 according to an embodiment of this application. It should be understood that the access network device 1100 shown in FIG. 11 is merely an example. The access network device in this embodiment of this application may further include another module or unit, or may include modules having functions similar to those of the modules in FIG. 11, or may not need to include all the modules in FIG. 11.

The access network device 1100 shown in FIG. 11 may perform operations performed by the access network device in the communication method shown in FIG. 3, FIG. 4, FIG. 5, FIG. 6, or FIG. 7. Specifically, the access network device 1100 may include a sending module 1110.

The sending module 1110 is configured to send first information to a terminal, where the first information is used to instruct the terminal to monitor a first downlink control channel after the terminal completes initial transmission of first uplink data in a first-type transmission mode, the first downlink control channel carries first downlink control information, the first-type transmission mode includes performing grant-free uplink data transmission based on radio resource control configuration signaling or based on radio resource control reconfiguration signaling and not based on layer 1 signaling, and the first downlink control information includes HARQ feedback information for the first uplink data, retransmission scheduling information for the first uplink data, or scheduling information for second uplink data.

The sending module 1110 is further configured to send the first downlink control information on the first downlink control channel after the initial transmission of the first uplink data is received.

The access network device indicates the first information to the terminal, to instruct the terminal to monitor, after the terminal completes the initial transmission of the first uplink data in the first-type transmission mode, the first downlink control channel sent by the access network device, so that energy consumption of the terminal can be reduced.

In one embodiment, the sending module 1110 is further configured to:

send second information to the terminal, where the second information is used to indicate a first time interval, the first time interval is a time interval between a second moment at which the terminal detects the first downlink control information and a first moment at which the terminal switches from the first-type transmission mode to a third-type transmission mode, and the third-type transmission mode includes performing grant-free uplink data transmission based on radio resource control configuration signaling or based on radio resource control reconfiguration signaling and based on a configuration parameter modified by using layer 1 signaling.

In one embodiment, the access network device 1100 further includes a receiving module 1120.

The receiving module 1120 is configured to: receive third information sent by the terminal, where the third information is used to indicate a minimum time used by the terminal to switch from the first-type transmission mode to the third-type transmission mode.

The first time interval is greater than or equal to the minimum time.

Figure 12:
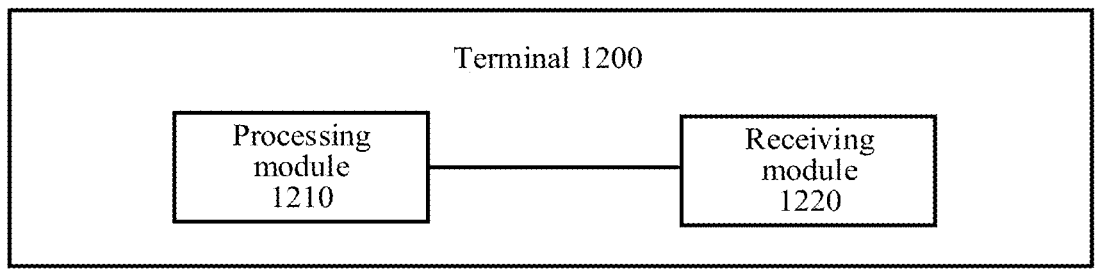
FIG. 12 is a schematic structural diagram of a terminal according to another embodiment of this application.

FIG. 12 is a schematic structural diagram of a terminal 1200 according to an embodiment of this application. It should be understood that the terminal 1200 shown in FIG. 12 is merely an example. The terminal in this embodiment of this application may further include another module or unit, or may include modules having functions similar to those of the modules in FIG. 12, or may not need to include all the modules in FIG. 12.

The terminal 1200 shown in FIG. 12 may perform operations performed by the terminal in the communication method shown in FIG. 8 or FIG. 9. Specifically, the terminal 1200 may include a processing module 1210.

A processing module 1210 is configured to monitor, on a first resource, a first downlink control channel sent by an access network device, where the first resource includes at least one of the following: a first core set, a first bandwidth part, a first beam, and a time domain resource of a first length, the first downlink control channel carries first downlink control information that is sent, when the terminal operates in a first-type transmission mode or a third-type transmission mode, to the terminal, the first-type transmission mode includes performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode.

The processing module 1210 is further configured to: monitor, on a second resource, a second downlink control channel sent by the access network device, where the second resource includes at least one of the following: a second core set, a second bandwidth part, a second beam, and a time domain resource of a second length, the second control channel carries second downlink control information that is sent, when the terminal operates in a second-type transmission mode, to the terminal, the second-type transmission mode includes performing grant-free uplink data transmission based on radio resource control configuration signaling or based on radio resource control reconfiguration signaling and based on activation or deactivation performed by using layer 1 signaling, and the second downlink control information includes at least one of the following information: information for activating the terminal to transmit, in a grant-free mode, third uplink data to be sent by the terminal in the second-type transmission mode, information for deactivating the terminal to transmit the third uplink data in a grant-free mode, HARQ feedback information for the third uplink data, and information for instructing the terminal to retransmit the third uplink data.

The processing module 1210 is further configured to detect the first downlink control information from the monitored first downlink control channel.

The processing module 1210 is further configured to detect the second downlink control information from the monitored second downlink control channel.

The terminal monitors, on different resources, downlink control channels corresponding to uplink data transmitted by using different transmission types. This helps reduce complexity of monitoring, by the terminal, the downlink control channels corresponding to the uplink data of the transmission types.

In one embodiment, the terminal 1200 further includes a receiving module 1220. The receiving module 1220 is configured to:

receive first information sent by the access network device, where the first information is used to instruct the terminal to monitor the first downlink control channel on the first resource; and receive second information sent by the access network device, where the second information is used to instruct the terminal to monitor the second downlink control channel on the second resource; and the processing module 1210 is specifically configured to:

monitor, on the first resource indicated by the first information, the first downlink control channel sent by the access network device; and monitor, on the second resource indicated by the second information, the second downlink control channel sent by the access network device.

In one embodiment, the first downlink control information is downlink control information scrambled by using a cell radio network temporary identifier or a group radio network temporary identifier, and the second downlink control information is downlink control information scrambled by using a semi-persistent scheduling (SP S) radio network temporary identifier.

Figure 13:
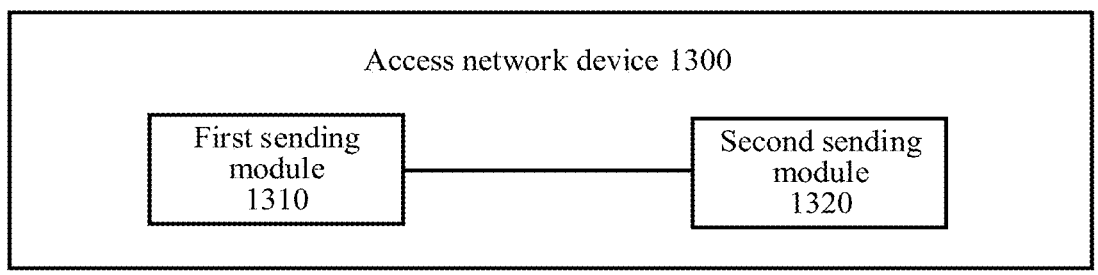
FIG. 13 is a schematic structural diagram of an access network device according to another embodiment of this application.

FIG. 13 is a schematic structural diagram of an access network device 1300 according to an embodiment of this application. It should be understood that the access network device 1300 shown in FIG. 13 is merely an example. The access network device in this embodiment of this application may further include another module or unit, or may include modules having functions similar to those of the modules in FIG. 13, or may not need to include all the modules in FIG. 13.

The access network device 1300 shown in FIG. 13 may perform operations performed by the access network device in the communication method shown in FIG. 9. Specifically, the access network device 1300 may include a first sending module 1310 and a second sending module 1320.

The first sending module 1310 is configured to send first information to a terminal, where the first information is used to instruct the terminal to monitor a first downlink control channel on a first resource, the first resource includes at least one of the following: a first core set, a first bandwidth part, a first beam, and a time domain resource of a first length, the first downlink control channel carries first downlink control information sent when the terminal operates in a first-type transmission mode or a third-type transmission mode, the first-type transmission mode includes performing grant-free uplink data transmission based on radio resource control configuration signaling or based on radio resource control reconfiguration signaling and not based on layer 1 signaling, the third-type transmission mode includes performing grant-free uplink data transmission based on radio resource control configuration signaling or based on radio resource control reconfiguration signaling and based on a configuration parameter modified by using layer 1 signaling, and the first downlink control information includes HARQ feedback information for first uplink data, retransmission scheduling information for the first uplink data, or scheduling information for second uplink data sent by the terminal in the first-type transmission mode or the third-type transmission mode.

The second sending module 1320 is configured to send second information to the terminal, where the second information is used to instruct the terminal to monitor a second downlink control channel on a second resource, the second resource includes at least one of the following: a second core set, a second bandwidth part, a second beam, and a time domain resource of a second length, the second control channel include s second downlink control information sent when the terminal operates in a second-type transmission mode, the second-type transmission mode includes performing grant-free uplink data transmission based on radio resource control configuration signaling or based on radio resource control reconfiguration signaling and based on activation or deactivation performed by using layer 1 signaling, the second downlink control information includes at least one of the following information: information for activating the terminal to transmit, in a grant-free mode, third uplink data to be sent by the terminal in the second-type transmission mode, information for deactivating the terminal to transmit the third uplink data in a grant-free mode, HARQ feedback information for the third uplink data, and information for instructing the terminal to retransmit the third uplink data.

The access network device indicates, to the terminal, resources on which the first downlink control channel and the second downlink control channel are monitored. This helps improve communication flexibility.

In one embodiment, the first downlink control information is downlink control information scrambled by using a cell radio network temporary identifier or a group radio network temporary identifier, and the second downlink control information is downlink control information scrambled by using a semi-persistent scheduling (SP S) radio network temporary identifier.

Figure 14:
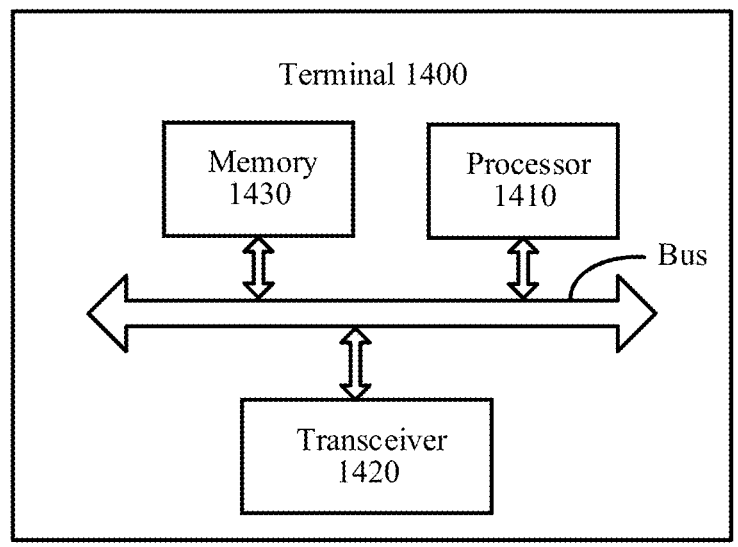
FIG. 14 is a schematic structural diagram of a terminal according to another embodiment of this application.

FIG. 14 is a schematic structural diagram of a terminal according to another embodiment of this application. It should be understood that the terminal 1400 shown in FIG. 14 is merely an example. The terminal in this embodiment of this application may further include another module or unit, or may include modules having functions similar to those of the modules in FIG. 14, or may not need to include all the module s in FIG. 14.

The terminal 1400 shown in FIG. 14 may perform the operations performed by the modules in the terminal shown in FIG. 10. Specifically, a processor 1410 may perform the operation performed by the processing module 1010, and a transceiver 1420 may perform the operations performed by the receiving module 1020 and the sending module 1030.

In one embodiment, the terminal 1400 may further include a memory 1430. In one embodiment, the memory 1430 may be integrated together with the processor 1410.

Figure 15:
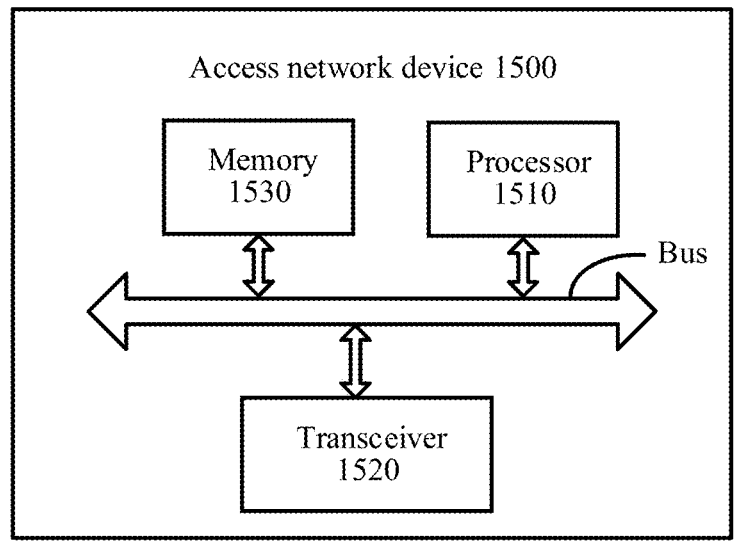
FIG. 15 is a schematic structural diagram of an access network device according to another embodiment of this application.

FIG. 15 is a schematic structural diagram of an access network device 1500 according to another embodiment of this application. It should be understood that the access network device 1500 shown in FIG. 15 is merely an example. The access network device in this embodiment of this application may further include another module or unit, or may include modules having functions similar to those of the modules in FIG. 15, or may not need to include all the modules in FIG. 15.

The access network device 1500 shown in FIG. 15 may perform the operations performed by the modules in the access network device shown in FIG. 11. Specifically, a processor 1510 may execute program code, and a transceiver 1520 may perform the operations performed by the receiving module 1120 and the sending module 1110.

In one embodiment, the access network device 1500 may further include a memory 1530. In one embodiment, the memory 1530 may be integrated together with the processor 1510.

Figure 16:
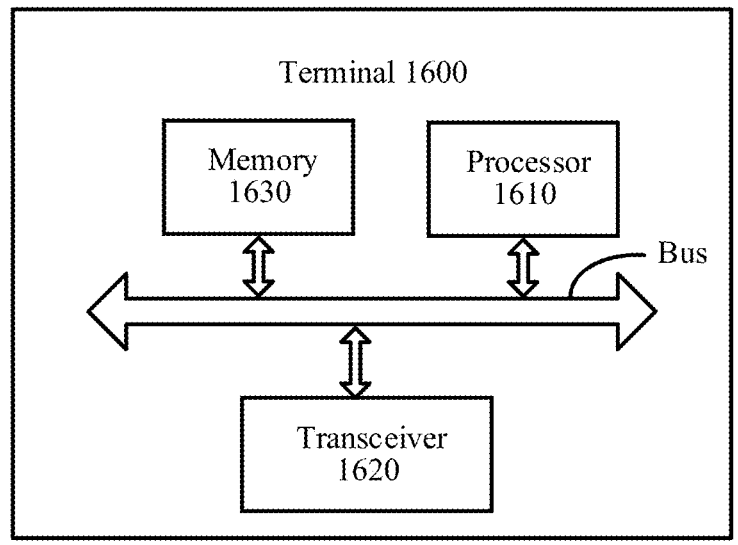
FIG. 16 is a schematic structural diagram of a terminal according to another embodiment of this application.

FIG. 16 is a schematic structural diagram of a terminal 1600 according to another embodiment of this application. It should be understood that the terminal 1600 shown in FIG. 16 is merely an example. The terminal in this embodiment of this application may further include another module or unit, or may include modules having functions similar to those of the modules in FIG. 16, or may not need to include all the modules in FIG. 16.

The terminal 1600 shown in FIG. 16 may perform the operations performed by the modules in the terminal shown in FIG. 12. Specifically, a processor 1610 may perform the operation performed by the processing module 1210, and a transceiver 1620 may perform the operation performed by the receiving module 1220.

In one embodiment, the terminal 1600 may further include a memory 1630. In one embodiment, the memory 1630 may be integrated together with the processor 1610.

Figure 17:
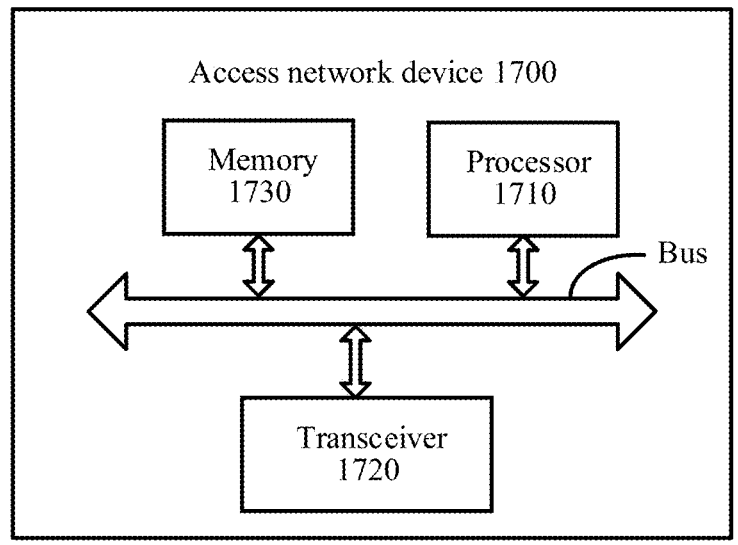
FIG. 17 is a schematic structural diagram of an access network device according to another embodiment of this application.

FIG. 17 is a schematic structural diagram of an access network device 1700 according to another embodiment of this application. It should be understood that the access network device 1700 shown in FIG. 17 is merely an example. The access network device in this embodiment of this application may further include another module or unit, or may include modules having functions similar to those of the modules in FIG. 17, or may not need to include all the modules in FIG. 17.

The access network device 1700 shown in FIG. 17 may perform the operations performed by the modules in the terminal shown in FIG. 13. Specifically, a processor 1710 may perform program code, and a transceiver 1720 may perform the operations performed by the first sending module 1310 and the second sending module 1320.

In one embodiment, the access network device 1700 may further include a memory 1730. In one embodiment, the memory 1730 may be integrated together with the processor 1710.

Figure 18:
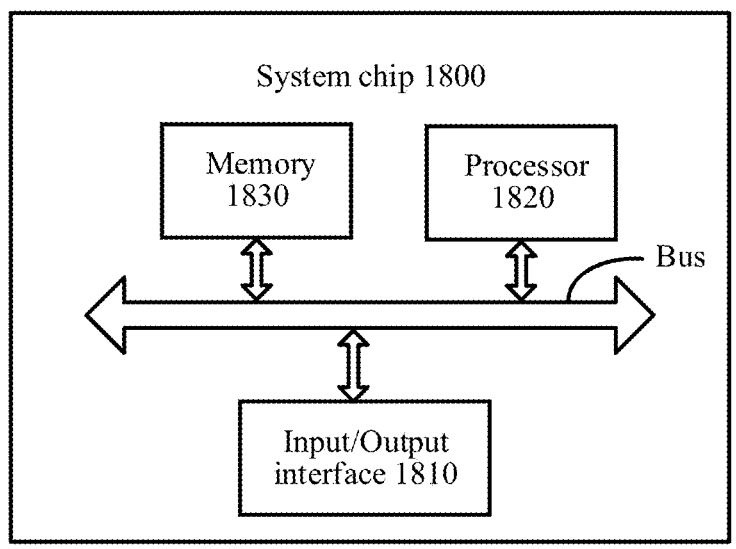
FIG. 18 is a schematic structural diagram of a system chip according to an embodiment of this application.

As shown in FIG. 18, an embodiment of this application further provides a system chip 1800. The system chip includes an input/output interface 1810, at least one processor 1820, at least one memory 1830, and a bus. The at least one memory is configured to store instructions, the at least one processor is configured to invoke the instructions in the at least one memory, to perform the operations in the communication method shown in FIG. 2, FIG. 3, FIG. 4, FIG. 5, FIG. 6, FIG. 7, FIG. 8, or FIG. 9.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A terminal, comprising:
a processor, configured to monitor, after an initial transmission of first uplink data is completed in a first-type transmission mode, a first downlink control channel sent by an access network device, wherein the first downlink control channel carries first downlink control information that is sent, by the access network device when the terminal operates in the first-type transmission mode, to the terminal, wherein the first-type transmission mode comprises grant-free uplink data transmission based on radio resource control (RRC) configuration signaling or based on RRC reconfiguration signaling and not based on layer 1 signaling, and wherein the first downlink control information comprises hybrid automatic repeat request (HARQ) feedback information for the first uplink data, retransmission scheduling information for the first uplink data, or scheduling information for second uplink data, wherein
the processor is further configured to detect the first downlink control information on the first downlink control channel and to switch from the first-type transmission mode to a third-type transmission mode at a first moment after the first downlink control information is detected on the first downlink control channel, wherein the third-type transmission mode comprises grant-free uplink data transmission based on RRC configuration signaling or based on RRC reconfiguration signaling and based on a configuration parameter modified by using layer 1 signaling.

2. The terminal according to claim 1, further comprising:
a receiver, configured to receive first information sent by the access network device, wherein the first information is used to instruct the terminal to monitor the first downlink control channel after the terminal completes the initial transmission of the first uplink data in the first-type transmission mode.

3. The terminal according to claim 2, wherein the receiver is further configured to receive second information sent by the access network device, wherein the second information is used to indicate a first time interval, and wherein the first time interval is a time interval between a second moment at which the terminal detects the first downlink control information and the first moment at which the terminal switches from the first-type transmission mode to the third-type transmission mode.

4. The terminal according to claim 3, further comprising:
a transmitter, configured to send third information to the access network device, wherein the third information is used to indicate a minimum time required by the terminal to switch from the first-type transmission mode to the third-type transmission mode, wherein
the first time interval is greater than or equal to the minimum time.

5. The terminal according to claim 1, wherein the processor is further configured to switch from the first-type transmission mode to a third-type transmission mode after grant-free area adjustment signaling or bandwidth part (BWP) adjustment signaling sent by the access network device is received, or slot format indicator (SFI) adjustment signaling is received and a format of a current slot is adjusted based on an instruction of the SFI adjustment signaling, wherein the third-type transmission mode comprises grant-free uplink data transmission based on RRC configuration signaling or based on RRC reconfiguration signaling and based on a configuration parameter modified by using layer 1 signaling.

6. An access network device, comprising:
a transmitter, configured to send first information to a terminal, wherein the first information is used to instruct the terminal to monitor a first downlink control channel after the terminal completes an initial transmission of first uplink data in a first-type transmission mode, wherein the first downlink control channel carries first downlink control information, wherein the first-type transmission mode comprises grant-free uplink data transmission based on radio resource control (RRC) configuration signaling or based on RRC reconfiguration signaling and not based on layer 1 signaling, and wherein the first downlink control information comprises hybrid automatic repeat request (HARQ) feedback information for the first uplink data, retransmission scheduling information for the first uplink data, or scheduling information for second uplink data, wherein
the transmitter is further configured to send the first downlink control information on the first downlink control channel to the terminal after the initial transmission of the first uplink data is received and to send second information to the terminal, wherein the second information is used to indicate a first time interval, wherein the first time interval is a time interval between a second moment at which the terminal detects the first downlink control information and a first moment at which the terminal switches from the first-type transmission mode to a third-type transmission mode, and wherein the third-type transmission mode comprises grant-free uplink data transmission based on RRC configuration signaling or based on RRC reconfiguration signaling and based on a configuration parameter modified by using layer 1 signaling.

7. The access network device according to claim 6, wherein the access network device further comprises a receiver, configured to receive third information sent by the terminal, wherein the third information is used to indicate a minimum time required by the terminal to switch from the first-type transmission mode to the third-type transmission mode, wherein
the first time interval is greater than or equal to the minimum time.

8. The access network device according to claim 6, wherein the transmitter is further configured to send to the terminal grant-free area adjustment signaling, bandwidth part (BWP) adjustment signaling, or slot format indicator (SFI) adjustment signaling that are used by the terminal to switch from the first-type transmission mode to a third-type transmission mode, wherein the third-type transmission mode comprises grant-free uplink data transmission based on RRC configuration signaling or based on RRC reconfiguration signaling and based on a configuration parameter modified by using layer 1 signaling.

9. A method for communication by a terminal, comprising:
transmitting first uplink data in a first-type transmission mode to an access network device, wherein the first-type transmission mode comprises performing grant-free uplink data transmission based on radio resource control (RRC) configuration signaling or based on RRC reconfiguration signaling and not based on layer 1 signaling;
monitoring a first downlink control channel sent by the access network device, wherein the first downlink control channel carries first downlink control information that is sent, by the access network device when the terminal operates in the first-type transmission mode, and wherein the first downlink control information comprises hybrid automatic repeat request (HARQ) feedback information for the first uplink data, retransmission scheduling information for the first uplink data, or scheduling information for second uplink data;
detecting the first downlink control information on the first downlink control channel; and
switching, by the terminal, from the first-type transmission mode to a third-type transmission mode at a first moment after detecting the first downlink control information on the first downlink control channel, wherein the third-type transmission mode comprises performing grant-free uplink data transmission based on RRC configuration signaling or based on RRC reconfiguration signaling and based on a configuration parameter modified by using layer 1 signaling.

10. The method according to claim 9, further comprising:
receiving, by the terminal, first information sent by the access network device, wherein the first information is used to instruct the terminal to monitor the first downlink control channel after the terminal completes transmitting the first uplink data in the first-type transmission mode.

11. The method according to claim 10, further comprising:
receiving, by the terminal, second information sent by the access network device, wherein the second information is used to indicate a first time interval, and wherein the first time interval is a time interval between a second moment at which the terminal detects the first downlink control information and the first moment at which the terminal switches from the first-type transmission mode to the third-type transmission mode.

12. The method according to claim 11, further comprising:
sending, by the terminal, third information to the access network device, wherein the third information is used to indicate a minimum time required by the terminal to switch from the first-type transmission mode to the third-type transmission mode, wherein the first time interval is greater than or equal to the minimum time.

13. The method according to claim 9, further comprising:
receiving, by the terminal from the access network device, grant-free area adjustment signaling, bandwidth part (BWP) adjustment signaling, or slot format indicator (SFI) adjustment signaling, wherein an instruction of the SFI adjustment signaling is used to adjust a format of a current slot; and
switching, by the terminal, from the first-type transmission mode to a third-type transmission mode, wherein the third-type transmission mode comprises performing grant-free uplink data transmission based on RRC configuration signaling or based on RRC reconfiguration signaling and based on a configuration parameter modified by using layer 1 signaling.

14. A method for communication by an access network device, comprising:
transmitting first information to a terminal, wherein the first information is used to instruct the terminal to monitor a first downlink control channel after the terminal completes transmitting first uplink data in a first-type transmission mode, wherein the first downlink control channel carries first downlink control information, wherein the first-type transmission mode comprises performing grant-free uplink data transmission based on radio resource control (RRC) configuration signaling or based on RRC reconfiguration signaling and not based on layer 1 signaling, and wherein the first downlink control information comprises hybrid automatic repeat request (HARQ) feedback information for the first uplink data, retransmission scheduling information for the first uplink data, or scheduling information for second uplink data;
receiving, from the terminal, the first uplink data in the first-type transmission mode;
transmitting the first downlink control information on the first downlink control channel to the terminal; and
transmitting, by the access network device, second information to the terminal, wherein the second information is used to indicate a first time interval, wherein the first time interval is a time interval between a second moment at which the terminal detects the first downlink control information and a first moment at which the terminal switches from the first-type transmission mode to a third-type transmission mode, and wherein the third-type transmission mode comprises performing grant-free uplink data transmission based on RRC configuration signaling or based on RRC reconfiguration signaling and based on a configuration parameter modified by using layer 1 signaling.

15. The method according to claim 14, further comprising:
receiving, by the access network device, third information from the terminal, wherein the third information is used to indicate a minimum time required by the terminal to switch from the first-type transmission mode to the third-type transmission mode, wherein the first time interval is greater than or equal to the minimum time.

16. The method according to claim 14, further comprising:
transmitting, by the access network device to the terminal, grant-free area adjustment signaling, bandwidth part (BWP) adjustment signaling, or slot format indicator (SFI) adjustment signaling that are used by the terminal to switch from the first-type transmission mode to a third-type transmission mode, wherein the third-type transmission mode comprises performing grant-free uplink data transmission based on RRC configuration signaling or based on RRC reconfiguration signaling and based on a configuration parameter modified by using layer 1 signaling.

* * * * *